United States Patent Office 2,800,419
Patented July 23, 1957

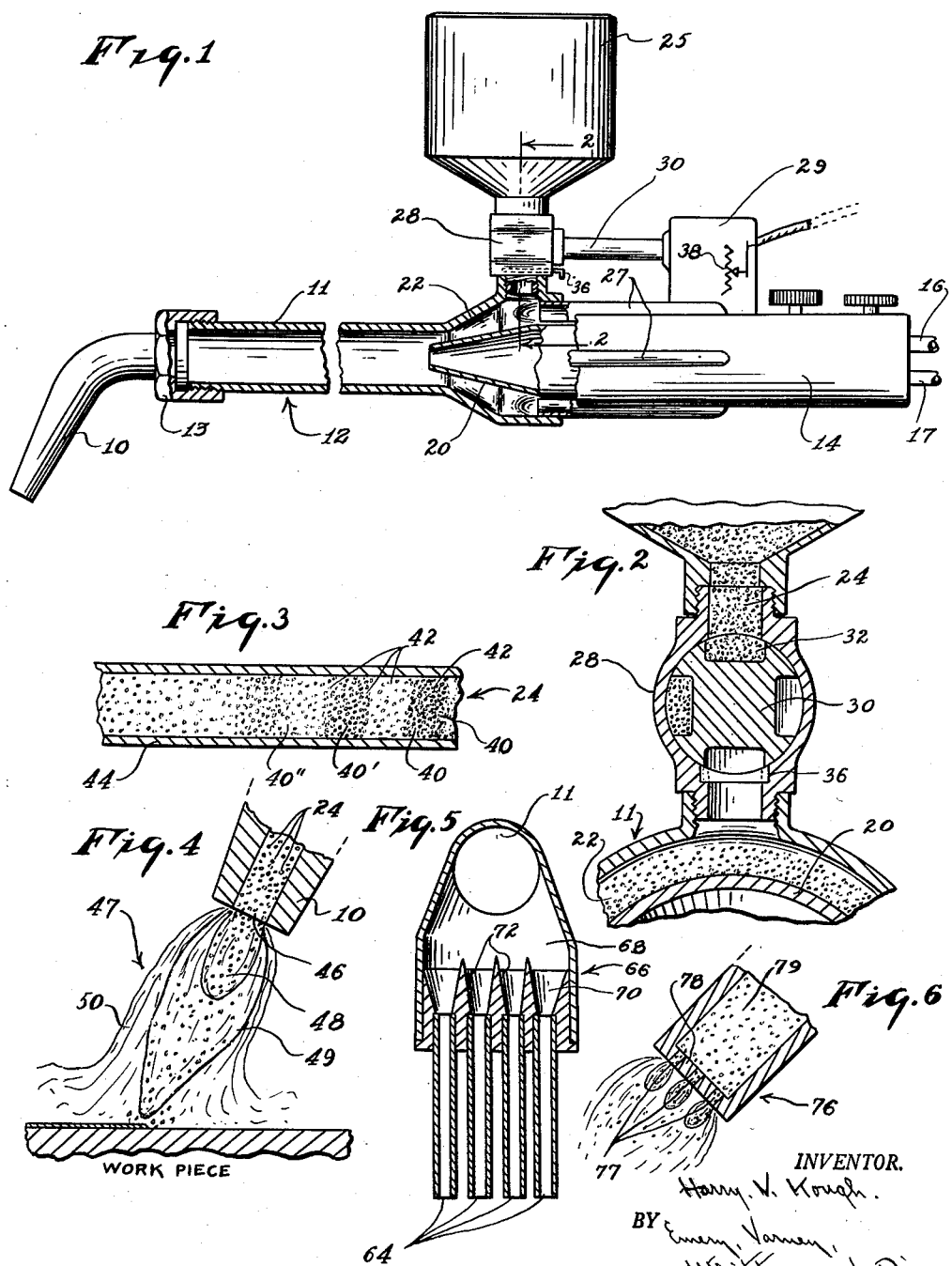

2,800,419

METHOD AND APPARATUS FOR HARD SURFACING METALS

Harry V. Kough, Chester, Pa., assignor to Coast Metals, Inc., Little Ferry, N. J., a corporation of Delaware Application November 27, 1953, Serial No. 394,529

13 Claims. (Cl. 117—46)

This invention relates to method and apparatus for applying hard surfacing material to metal surfaces.

One of the ways in which a layer of hard surfacing material can be applied to a metal part is by fusing metal powder on the heated surface of the part to be covered. The practice becomes more difficult when the powder is an alloy having a melting point not greatly lower than the melting point of the metal to be covered. Some methods, which have been successful for applying coatings of low melting alloys, have been unsuccessful with hard facing alloys having higher melting points.

One of the difficulties encountered with metal powder has been the control of the powder feed. Some methods and apparatus have been limited to comparatively low rates of metal deposit because the feeding of the powder could not be increased to a high rate without clogging or unreliable feeding in the powder passages. Others have obtained results which were not uniform, and the methods and apparatus have not been sufficiently consistent, in their operation, to permit the use of mechanical feeding of the torch and powder supply apparatus across the surface to be coated. Even with hand-manipulated torches, an unexpected stoppage of the powder flow will sometimes cause the operator to burn the base metal. A more uniform powder flow requires less skill of the operator.

One object of this invention is to provide an improved method for applying a layer of hard surfacing material to a workpiece. Another object is to provide a method having greater flexibility for meeting the variable conditions, such as preheating, melting point, and powder feed rate, encountered in hard surfacing operations. Still another object is to provide a method which can be carried out with less complicated apparatus than has been required with prior equipment and to make application of the powder and the fusing of the powder one operation.

Another object of the invention is to provide improved apparatus for carrying out the method of this invention.

One of the features of the invention relates to the feeding of the powder to the surface of the workpiece in such a way as to obtain efficient operation of the torch and consistent control of the powder feed. Another feature relates to the heating of the powder so as to improve the hard surfacing operation.

Other objects, features and advantages of the invention will appear or be pointed out as the description proceeds.

In the drawing, forming a part hereof, in which like reference characters indicate corresponding parts in all the views:

Figure 1 is a side view, partly broken away and in section, showing apparatus for hard surfacing a workpiece in accordance with this invention;

Figure 2 is a view showing a powder dispenser which is used with the apparatus shown in Figure 1;

Figure 3 is a greatly enlarged view of a passage through which powder is conveyed by the gas stream from a dispenser which does not provide uniform continuous flow;

Figure 4 is a greatly enlarged view of the tip, shown in Figure 1, in working relation to a surface to be coated; and Figures 5 and 6 are sectional views through modified forms of the invention.

Figure 1 shows a torch having a tip 10 connected to a dispersion fitting 11, of a torch 12, by a conventional tip nut 13. The torch has a mixer 14 and the dispersion fitting 11 is attached to the mixer 14 by a nut 15 similar to the tip nut 13. The mixer 14 is supplied with oxygen and fuel gas through inlet fittings 16 and 17. These fittings are connected with suitable hoses leading from cylinders or other sources of fuel gas and oxygen. The fuel gas used is preferably acetylene but other gases can be employed.

The torch 12 also contains an aspirator 20 through which the mixed oxygen and fuel gas are discharged toward the tip end of the torch. This aspirator 20 creates a partial vacuum in a space consisting of an annular chamber 22 to which powder 24 is supplied from a powder holder 25. The annular chamber 22 has angularly spaced tubes 27 through which fuel gas flows from a chamber at the upstream end of the mixer 14. This is the region where the initial velocity toward the tip is imparted to the powder. The aspirator 20 and the chamber 22 are located at a substantial distance upstream from the flame jet and from the torch tip 10. The actual distance can be changed by replacing the dispersion fitting 11 with another which is longer or shorter depending upon the tip size. The different dispersion fittings are of different internal transverse cross section so as to obtain velocities of flow necessary for effectively carrying the powder particles through the passage enclosed by the dispersion fitting 11. A particular size of dispersion fitting can be used with different tips which do not have any substantial differences in their rates of gas discharge.

When a greater flow of gas and greater heat output are needed, larger tips are used; and this requires the use of higher gas pressure to maintain sufficient velocity of the gas stream to prevent flashbacks at the tip orifice. In order to maintain a moderate gas velocity through the dispersion fitting, with sufficient time for uniform dispersion of the powder, a dispersion fitting of larger diameter is used for the larger tip. Since the supply of gas to tips of different size must be regulated to maintain a critical velocity at the tip orifice, this invention controls the velocity through the dispersion chamber by using dispersion fittings of different size.

In the preferred construction of the invention the cross section of the dispersion chamber should not be more than about three to five times the cross section of the tip orifice, and the length of the dispersion chamber should be at least eight times as long as its diameter, or average transverse axis, if the cross section is not round.

If the cross section of the dispersion fitting passage is small, the velocity is higher and the time within which the powder can disperse uniformly is less for any given length of fitting. In order to avoid unnecessary length in the torch, the transverse cross section of the dispersion chamber is made substantially larger than that of the tip orifice, preferably two or three times as large.

During its travel through the dispersion chamber, the powder particles accelerate to substantially the velocity of the gas stream and distribute transversely and longitudinally throughout the gas stream, as will be explained more fully in connection with Figure 3.

It is a feature of the invention that a powder 24 has rounded particles as compared with the flat, flake-like particles of some powders. The powder 24 is a powder which is free of any substantial quantity of flake particles. This makes it possible to feed the particles at higher powder concentration, through the passages of the torch. Substantially all of the particles of the powder 24 are spherical or otherwise rounded. They have less tendency to catch on shoulders or other transversely extending surfaces or imperfections in the passages, and less tendency to catch on each other and build up a block at regions where any of the powder does stop.

Another advantage of using powder having rounded particles is the reduction in abrasion in the torch passages. This makes it practical to introduce the powder into the gas stream at a substantial distance back from the tip so that the power particles acquire a high velocity, and travel in the gas stream long enough for the particles to become uniformly distributed, as will be explained more fully in connection with Figures 2 and 3. Powder having rounded particles are obtained by certain powder techniques which are well-known. One example is the use of a molten stream of liquid which is finally atomized in a gas stream having a temperature low enough to solidify the finely divided particles. Such powder may be treated, if necessary, to remove the larger particles, though the maximum permissible particle size depends largely upon the equipment in which the powder is to be used.

The powder may be a hard surfacing alloy having a high melting point, because this invention makes it practical to hard surface workpieces with alloys that have high melting points. The expression "high melting point" for purposes of this invention, means a melting point approaching that of steel; that is, a melting point above about 2400° F. to 2600° F.

The powder 24 may flow from the holder 25 by gravity with a simple apparatus, but this does not provide an adequate control for the rate of powder supply. Valves, such as turn cocks, have been used to control the rate of powder feed by gravity, but their operation is not satisfactory over wide ranges of powder flow. Even with powder having rounded particles, the control of the feed by greatly restricting the cross section of the passage sometimes results in clogging of the valve passage.

Better control of the powder feed is obtained by having some form of dispenser. A dispenser serves two purposes. One is that it supplies the powder in measured quantities and the other is that the mechanical movement of the dispenser supplies some agitation for preventing possible clogging of the powder. Stating this latter advantage in a different way, the agitation of the dispenser makes it practical to coat with powdered material which is less free flowing than those which have to be used where there is no agitation of any kind.

Figure 1 shows a powder dispenser located in a fitting 28 between the aspirator 20 and the holder 25. This dispenser is driven by a very small electric or air or gas motor 29 mounted on the torch body and connected to the torch body by motion-transmitting connections, such as a shaft 30. Figure 2 shows the dispenser on a larger scale. The fitting 28 is connected with the torch body 11 and the shaft 30, within the fitting, is provided with notches 32 which serve as measuring chambers for the powder 24. As the shaft 30 rotates, successive notches 32 come under a top opening in the fitting 28 so that powder drops into and fills each successive notch.

As the shaft 30 continues to rotate, each of the notches 32 passes over an outlet opening at the bottom of the fitting 28 so that the powder in the notch drops through the outlet opening into the annular chamber 22 from which the powder is drawn by the aspirator, as already explained. The rate of feed can be controlled by a slide 36 which prevents the notches 32 from being filled completely; or the rate of feed can be controlled by slowing down the speed of the motor 29 (Figure 1). An adjustable rheostat 38, connected to the power supply of the motor 29, is merely representative of means for controlling the motor speed and the resulting rate of powder feed.

Figure 3 is a diagrammatic showing of the metal powder in a gas passage leading to the torch tip. When the powder 24 is fed into the torch by the dispenser, the supply of powder is not completely uniform. Immediately after the discharge of a quantity of powder into the air stream, there is a portion of the stream in which the powder is more concentrated. Such portions are indicated by the reference character 40. The regions of greater powder density are separated from one another by regions 42 where the powder density is less. As the denser portions 40 of the stream move on to positions indicated by the reference characters 40′ and 40″, the powder particles tend to separate into the regions between these denser portions of the stream so that with a sufficiently long passage 44, the powder distribution is substantially uniform lengthwise of the stream.

Figure 4 is an enlarged view of the tip 10 with a flame jet orifice 46 through which the powder 24 is discharged in the gas stream and at a velocity substantially equal to that of the gas stream. The oxy-fuel gas mixture burns, in a flame jet 47 having an inner cone 48, an outer cone 49, and an envelope 50. The highest temperature of the flame jet 47 is at the forward end of the inner cone 48 and it is a feature of this invention that the powder 24 passes through this region of maximum temperature. This adds to the efficiency of the torch.

When surfacing work pieces which can be preheated by placing them in a furnace or by other low cost heating, the more expensive oxy-fuel gas mixture of the torch is used principally for fusing the powder. With methods that introduce the powder into the envelope of the flame jet, the oxy-fuel gas mixture is not utilized to the best advantage and the efficiency of the method is lower and consequently more expensive.

By introducing the powder into the gas stream at a substantial distance back from the flame jet, the powder acquires a velocity substantially equal to that of the gas stream, the final acceleration taking place in the tip. This provides the highest rate of powder flow that can be obtained with any given powder density in the gas stream. The equipment can be used with the maximum density which can be safely put through the passages. This operates on a different principle from the expedient of increasing the quantity of powder supply by using a larger orifice 46 or using more than one orifice.

Thus, with any given supply of gas, and resulting heat output, this invention obtains the maximum powder supply through the flame jet orifice by passing the powder through the flame jet orifice at the highest velocity, which the jet will impart to the powder.

Another feature which results in greater efficiency of the tip is the use of fuel gas as the carrier for the powder from the aspirator of the torch. This avoids dilution of the flame jet by air, such as commonly employed; and the temperature of the flame is higher because it is not diluted. This is particularly true of oxy-acetylene flames which develop so much higher temperatures than fuel gas flames in which the oxygen is supplied in the form of air. The high heat concentration permits larger particle sizes to be melted in the short period of time during which the particles travel from the torch tip to the workpiece. This is an advantage in that it permits the use of powders which have been subjected to less rigorous screening. Such powders are less expensive than those which are restricted to smaller particle sizes.

With low-melting alloys, surfacing methods of the prior art have been able to fuse the powder by contact with a highly pre-heated surface; and other methods have fused the powder by passing the torch over the surface a number of times, or slowly enough, to fuse the powder after it has been deposited on the surface. The first of these methods has the disadvantage that it can be used with only a limited group of hard facing materials and is not suitable for the best hard facing materials. The second method has the disadvantage of being slow, expensive and not suitable for mechanical operation because the amount of repeated heating depends on variable conditions which must be watched by the operator. One of the variables is the amount of powder deposited.

On the workpieces that have been preheated, this invention makes the application of the powder one hundred percent faster than with cold plates that need substantial additional heating by the torch which applies the powder. Such pre-heating can be done by means of furnaces or specially designed heating torches which produce the heat at less cost than oxy-acetylene torches. This invention, with the powder of rounded particles, supplied to the gas stream at a substantial distance back from the tip, and fed through the flame jet orifice at high velocity, and through the inner cone of the flame jet, preferably without air dilution, applies such a uniform fused coating of hard surfacing material that the method lends itself to mechanical operation. The invention can also be carried out by operators of less skill, when performed manually.

It appears that the good results obtained with this invention result partly from the fact that the high velocity stream of powder travels directly to the work within the interior of the flame jet. The powder stays on the work where it is deposited and does not spread or blow over adjacent areas such as has been the case with other methods, particularly where the powder has been flowed by gravity into the envelope of the flame. Whether or not the surface is first coated with a flux, this invention avoids blowing away of the powder stream and results in an application of the hard surface material to the surface immediately below the jet orifice.

When a wide band of hard surface material is desired, successive passes can be made, or a number of flame jets can be applied simultaneously side by side, preferably from a multi-tip torch. With such a torch, as shown in Figure 5, a plurality of tips 64 are connected with a common distributing header 66. This header 66 is attached to the torch body 11 in the same manner as the tip shown in Figure 1. Such a header, however, will ordinarily be used with a larger torch body than when only a single tip is to be employed.

The distributing header 66 includes a chamber 68 into which the oxy-fuel gas stream flows with the hard surfacing powder entrained in the stream. Converging passages 70 lead from the distributing chamber 68 to the upstream ends of the respective tips 64. In order to balance the flame jets issuing from the different tips 63, bushings 72 are inserted in the passages leading to the tips 64 which are most directly in line with the passage of the torch body from which the gas stream enters the header 66. For larger, multi-tip equipment, groups of tips are supplied with gas and entrained powder from separate mixers and through separate aspirators and acceleration passages.

Figure 6 shows another modified form of the tip 76 having a plurality of orifices 77 opening through an end face 78 of a chamber 79. These orifices 77 include a center orifice and a circle of other orifices, or other pattern for producing what amounts to a mat of flame with powder particles entrained in each flame jet of the mat.

The preferred operation of this invention and the preferred apparatus have been illustrated and described, but changes and modifications can be made without departing from the invention as defined in the claims.

What is claimed is:

1. The method of applying hard-surfacing material by a torch having a tip for supplying a flame jet, which method comprises supplying a stream of fuel gas to the torch tip from a substantial distance upstream from the tip, dropping metal powder, having substantially all particles of rounded contour, by gravity into a space within the torch at a substantial distance upstream from the tip, drawing the powder from said space into the fuel gas stream, passing the rounded particles of powder, entrained in the gas stream, through a dispersion zone in which the particles are accelerated to a velocity substantially equal to the gas flow velocity as they are carried by the gas stream to the torch tip, and from the tip through primary and secondary combustion cones of the flame jet supplied by the tip, and passing the flame jet across the surface of a workpiece while the powder particles are projected toward the workpiece by the flame jet.

2. The method of applying a high-melting point, hard-surfacing alloy by means of a torch having a tip for supplying a flame jet, which method comprises dropping metal powder by gravity into space within the torch and from this space introducing the powder into a stream of gas at a substantial distance upstream from the torch tip, the powder used having substantially all of its particles of rounded contour, accelerating the particles of powder and distributing them substantially uniformly throughout the gas stream both transversely and longitudinally of the gas stream by carrying the gas stream and the entrained particles through a long dispersion zone on their way to the torch tip, passing the particles of powder through the tip and through primary and secondary combustion cones of the flame jet, and passing the flame jet across the surface of a workpiece while the powder particles are projected toward the workpiece by the flame jet.

3. The method of applying the hard-surfacing alloy material, as described in claim 2, characterized by dispensing the rounded particles of the metal powder into the gas stream in batches, and further characterized by dispersing the rounded particles substantially uniformly through the gas stream by accelerating the powder particles, as they travel toward the torch tip, to a velocity approaching the rate of flame propagation through the gas stream in which the particles are entrained.

4. The method of applying the hard-surfacing material, as described in claim 2, characterized by the supplying of an oxy-fuel gas stream consisting of an oxy-acetylene mixture, and by the introducing of the powder particles into the stream with gas consisting of one of the constituents of the oxy-fuel gas mixture, passing the entrained powder and the gas mixture through a long acceleration zone toward the tip while accelerating the rounded powder particles to a velocity approaching that of the gas stream, melting the powder particles in the flame jet by passing them through the primary and secondary combustion cones of the flame jet, and passing the flame jet and its stream of molten particles across the surface of a workpiece with the torch tip spaced from the workpiece by a distance substantially greater than the length of the primary combustion cone of the flame jet.

5. The method of applying hard surfacing material by a torch having a tip for supplying a flame jet, which method comprises introducing into a gas space in the torch successive batches of metal powder having substantially all particles of the powder of rounded contours, aspirating the particles of powder from the gas space by means of a stream of oxygen and acetylene flowing toward the torch tip, supplying acetylene to the space into which the batches of powder are initially introduced so that some acetylene surrounds the powder as it is entrained from said space by the aspirator action of the oxy-acetylene stream, passing the gas and entrained powder through a long, unobstructed zone in which the powder is accelerated to substantially the same velocity as the gas and in which the particles are distributed substantially uniformly both transversely and longitudinally of the gas stream, fusing the rounded particles of powder by passing them through primary and secondary combustion cones of the flame jet, and depositing the molten particles on a workpiece by moving the flame jet across the workpiece with the tip spaced from the workpiece by a distance substantially less than the length of the flame jet.

6. The method of hard surfacing a workpiece which comprises directing an oxy-hydrocarbon fuel gas flame against the surface of a workpiece with the primary combustion cone of the flame spaced from the workpiece, mixing hydrocarbon fuel gas with a quantity of oxygen, and supplying the mixed gases to the flame in a continuous stream introducing a high melting point, hard surfacing metal alloy material into the gas stream in powdered condition with the particles of powder of rounded contours, introducing the powder into the gas stream at a region within the torch, and downstream from the region of mixing and at a substantial distance upstream from the flame, accelerating the powder particles on their way toward the flame, to substantially gas-stream velocity, and applying fused particles of the material to the surface of the workpiece by passing the particles of the powder through the primary combustion zone of the flame in directions generally parallel to the axis of said cone.

7. A torch for applying hard surfacing material to a workpiece, including a tip for projecting a flame jet against the workpiece, a powder holder on the torch, a powder space within the torch and to which powder is supplied from the holder, an aspirator within the torch, a mixer within which oxygen and fuel gas are mixed for supplying a combustible mixture to the torch tip, a passage through which one of the gases supplied to the mixer flows to the powder space for movement with the powder toward the aspirator, another passage in the torch through which a stream of the mixed gases flow to the torch tip and into which the powder is drawn at the location of the aspirator, the aspirator being located at a substantial distance from the tip and in position to withdraw powder directly from said powder space into the mixed gas stream passing toward the tip, and a long, unobstructed passage leading from the aspirator to the tip and in which the powder particles are accelerated by the gas stream and dispersed throughout the gas stream.

8. A hard surfacing torch having a tip for a flame jet which is directed against a workpiece to be surfaced, a powder holder, a powder space within the torch and to which powder is supplied by the holder, a dispenser between the holder and the powder space, the dispenser having at least one powder chamber movable from a charging position in communication with the powder holder to a discharge position in which the powder falls by gravity into said powder space, means for operating the dispenser repetitively to supply successive batches of powder to the powder space, said space communicating with a passage through which an oxy-fuel gas stream is supplied to the tip, and said passage being of substantial length to provide time for the acceleration of the powder particles to substantially the same velocity as the gas stream and for substantially uniform dispersion of the particles both transversely and longitudinally of the cross section of the gas stream in the vicinity of the tip.

9. A hard surfacing torch, including a tip for directing a flame jet against a workpiece, a powder holder, a powder space within the torch, a dispenser between the powder space and the holder including repetitive operating means to deposit successive batches of powder in the powder space, an aspirator within the torch in position to draw powder from the powder space, a mixer in which oxygen and fuel gas are mixed upstream from the aspirator and from which a stream of oxygen and fuel gas is supplied to the aspirator for drawing powder from the powder space, the aspirator being located at a substantial distance upstream from the tip, and a long, unobstructed passage in the torch leading from the aspirator and within which the powder is accelerated by entrainment in the gas stream.

10. A torch for applying hard surfacing alloy to a workpiece, said torch including a tip, a body portion from which a mixture of oxygen and fuel gas is supplied to the tip, a conduit for supplying powdered hard facing alloy material to the gas stream in the body portion of the tip, a powder holder in position for powder to drop through said conduit by gravity, a dispersion fitting located between the body portion and the tip and having a dispersion chamber therein and in which the powder is accelerated and distributed transversely and longitudinally in the oxygen-fuel gas mixture in the torch, means detachably connecting the upstream end of the dispersion chamber to the body portion of the torch, and other means for detachably connecting the tip to the downstream end of the dispersion chamber, said dispersion chamber having a cross section at least twice as great as the total outlet cross section of the tip and not greater than about three to five times the outlet cross section of the tip, the length of said dispersion chamber being at least eight times as long as the diameter of said chamber.

11. A hard surfacing torch including a plurality of tips, a distributing header with which the tips communicate, a long passage in the torch through which oxygen and fuel gas are supplied to the header, a powder space in the torch at the upstream end of the long passage, said space being in communication with the passage through which the oxy-fuel gas stream flows toward the tip, and means for moving the powder from said space into the oxy-fuel gas stream in the passage.

12. A hard surfacing torch including a powder holder, a powder space within the torch, an aspirator for withdrawing powder from the powder space, a mixer in which oxygen and fuel gas are intermingled for supplying a combustible mixture to a tip of the torch, a passage through which one of the gases from the mixer is supplied to the powder space, a dispenser located between the holder and the powder space, the dispenser having at least one powder chamber movable from a charging position in communication with the powder holder to a discharge position in which the powder falls by gravity into said powder space, means for operating the dispenser repetitively to deposit successive batches of powder in the powder space, a long, unobstructed passage leading from the aspirator to the tip and through which the stream of oxygen and fuel gas, with entrained powder, travels toward the tip end of the torch, a plurality of tips, at the tip end of the torch comunicating with said passage, and means within the torch for distributing the gas streams and entrained powder substantially uniformly among the plurality of tips.

13. A hard surfacing torch having a tip for a flame jet which is directed against a workpiece to be surfaced, a powder holder, a powder space within the torch and to which powder is supplied by the holder, a dispenser between the holder and the powder space, a motor on the torch operating the dispenser to supply successive batches of powder to the powder space, said space communicating with a passage through which an oxy-fuel gas stream is supplied to the tip, said passage being of substantial length to provide time for the acceleration of the powder particles to substantially the same velocity as the gas stream and for substantially uniform dispersion of the particles both transversely and longitudinally of the cross section of the gas stream in the vicinity of the tip, means for controlling the rate at which powder is dispensed to the powder space, said means including an adjustable device for changing the volume of powder in each batch and a speed adjustment for the motor for changing the time between successive batches of powder.

(References on following page)

References Cited in the file of this patent

UNITED STATES PATENTS

| | | |
|---|---|---|
| 1,128,059 | Schoop | Feb. 9, 1915 |
| 2,137,442 | Callan | Nov. 22, 1938 |
| 2,389,702 | Ullmer | Nov. 27, 1945 |
| 2,427,448 | Duccini et al. | Sept. 16, 1947 |
| 2,671,689 | Wett | Mar. 9, 1954 |

FOREIGN PATENTS

| | | |
|---|---|---|
| 953,863 | France | May 30, 1949 |

OTHER REFERENCES

Ballard: Metal Spraying and Sprayed Metal, third edition, page 16. Charles Griffin & Company, Limited (1948). (Copy in Division 25.)